United States Patent [19]

Ruff

[11] Patent Number: 5,013,344
[45] Date of Patent: * May 7, 1991

[54] ICEMAKER AND WATER PURIFIER WITH CONTROLLED CONDENSING TEMPERATURE

[75] Inventor: John D. Ruff, Alexandria, Va.

[73] Assignee: Thermadyne, Inc., Alexandria, Va.

[*] Notice: The portion of the term of this patent subsequent to Jul. 17, 2007 has been disclaimed.

[21] Appl. No.: 471,885

[22] Filed: Jan. 29, 1990

Related U.S. Application Data

[63] Continuation-in-part of Ser. No. 278,447, Dec. 1, 1988, Pat. No. 4,897,099.

[51] Int. Cl.$^5$ .............................. B01D 9/04; C02F 1/22
[52] U.S. Cl. ......................................... 62/532; 62/124; 62/238.5
[58] Field of Search .............. 62/123, 124, 532, 238.5, 62/196.4, 238.6, 516; 165/169, 56

[56] References Cited

U.S. PATENT DOCUMENTS

| | | | |
|---|---|---|---|
| 1,874,803 | 8/1932 | Reed | 62/238.6 X |
| 2,818,235 | 12/1957 | Baran | 165/56 |
| 2,912,230 | 11/1959 | Ratarczak | 62/516 X |
| 3,017,162 | 1/1962 | Haines et al. | 62/238.6 X |
| 3,513,663 | 5/1970 | Martin, Jr. et al. | 62/238.6 X |
| 4,262,489 | 4/1981 | Sakamoto | 62/124 |
| 4,941,902 | 7/1990 | Ruff | 62/532 |

Primary Examiner—William E. Tapolcai
Attorney, Agent, or Firm—Epstein, Edell & Retzer

[57] ABSTRACT

The system disclosed in my U.S. Pat. No. 4,897,099 for deriving purified ice pieces and purified water from tap water is modified by providing a metal or thermally conductive heat flow path from an alternative refrigerant condenser to the ice collection bin. In one embodiment the size/shape of the heat flow path provides sufficient heat flow resistance to maintain a temperature gradient thereacross whereby the bottom of the bin is at approximately 32° F. and the condensing rejection temperature is at least 60° F. In another embodiment the alternative condenser is undersized relative to the primary condenser (used in the non-melting mode). In a further embodiment the second condenser is operated in a partially flooded condition during the ice-melting mode to reduce its effective condensing surface area.

28 Claims, 2 Drawing Sheets

ICEMAKER AND WATER PURIFIER WITH CONTROLLED CONDENSING TEMPERATURE

CROSS-REFERENCE TO RELATED APPLICATION

This application is a Continuation-In-Part of my prior U S. patent application Ser. No. 07/278,447 filed Dec. 1, 1988, now U.S. Pat. No. 4,897,099. The entire disclosure in that patent is expressly incorporated herein by this reference.

BACKGROUND OF THE INVENTION

The present invention relates to a method and apparatus for providing purified ice pieces and purified liquid water from a source of unpurified liquid water. More particularly, the present invention provides an alternative approach to melting ice pieces in a method and apparatus of the type generally disclosed in my aforementioned U.S. Pat. No. 4,897,099.

In my U.S. Pat. No. 4,897,099 I disclose a method and apparatus for forming purified ice pieces from unpurified water, such as tap water. The ice pieces are periodically harvested and collected in a bin, the bottom of which is heated as necessary to melt desired quantities of the ice to provide a supply of purified water. In the embodiment disclosed in FIG. 6 of my aforesaid patent, heat for melting the ice is derived from an alternative condenser connected in the refrigerant flow path and disposed near the bottom of the ice bin. An air gap for material of low thermal conductivity is placed between the alternative condenser and the bin bottom, thereby avoiding the need for undesirably low condensing temperatures. Specifically, this technique permits the condensing temperature in the condenser coil to be maintained at approximately 110° F. while the melting temperature of the ice is approximately 32° F., resulting in a temperature gradient of approximately 78° F. extending through the separating gap/material.

The present invention provides an alternative method and apparatus for applying thermal energy to the ice collection bin bottom from the alternative condenser.

OBJECTS AND SUMMARY OF THE INVENTION

It is an object of the present invention to provide an alternative method and apparatus to that disclosed in my U.S. Pat. No. 4,897,099 for applying thermal energy to a collection bin for purified ice, thereby melting some of the ice to provide and collect purified water.

In accordance with the present invention, metal or other material of relatively high thermal conductivity is utilized to conduct heat from the alternative refrigerant condenser to the ice collection bin. The conductive material is configured with a small thickness and long path length to provide a high resistance to heat flow, thereby maintaining the necessary temperature gradient across the heat flow path to assure that the condensing function occurs at a temperature considerably higher (i.e., at least thirty or so degrees higher) than the ice melting temperature of approximately 32° F.

BRIEF DESCRIPTION OF THE DRAWINGS

These and other objects, features and many of the attendant advantages of the present invention will be appreciated more readily as they become better understood from a reading of the following description considered in connection with the accompanying drawings wherein like parts in each of the several figures are identified by the same reference numerals, and wherein.

DESCRIPTION OF THE PREFERRED EMBODIMENTS

Figure 1:
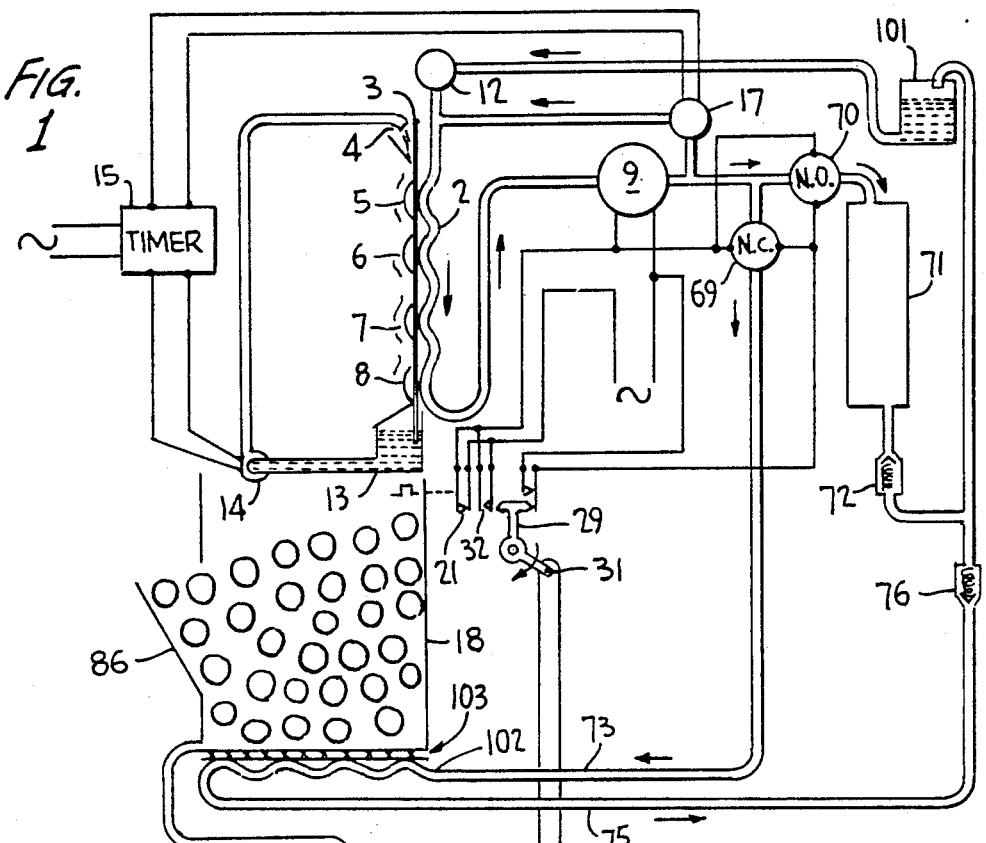
FIG. 1 is a schematic flow diagram of a system for forming purified ice pieces, collecting the ice pieces and melting the ice pieces to provide purified liquid water, in which system the present invention has utility.

In order to facilitate reference to the disclosure material incorporated herein from my U.S. Pat. No. 4,897,099, two-digit reference numerals appearing in the accompanying drawing are chosen to correspond to those reference numerals employed in the aforesaid patent for like elements. Three-digit reference numerals appearing in the accompanying drawings designate elements not present in the aforesaid patent. In the interest of brevity, and to facilitate understanding of the subject matter of the present invention, the following description omits discussion of the portions of the system not directly related to the invention subject matter.

Referring now to FIG. 1 of the accompanying drawings, the overall ice-forming and melting system is illustrated schematically. The harvested ice pieces in collection bin 18 are heated at selected times by alternative condenser 102 via a separation region 103 functioning to provide some degree of resistance to heat flow. Hot gas line 73 delivers compressed refrigerant vapor to condenser 102, and liquid flow line 75 conveys tho condensed refrigerant liquid to other parts of the system.

Figure 2:
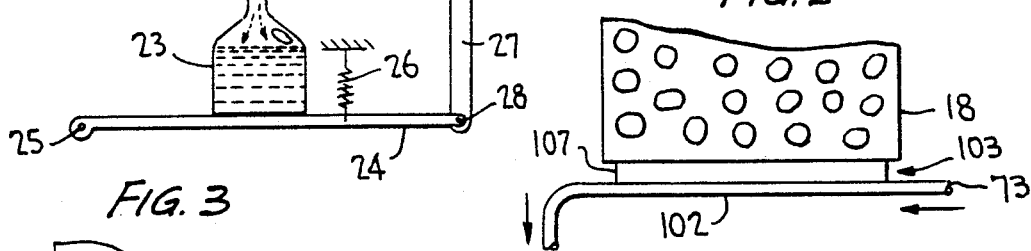
FIG. 2 is a front view in elevation of one embodiment of the present invention that may be employed in the system of FIG. 1.
Figure 3:
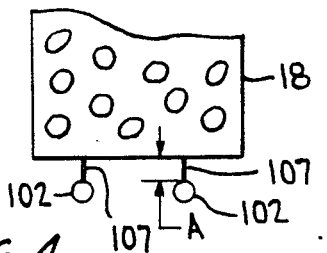
FIG. 3 is a side-view in elevation of the embodiment of FIG. 2.

Referring to FIGS. 2 and 3, one embodiment of present invention utilizes one or more heat conducting members 107 located in separation region 103 and extending between and in direct contact with alternative condenser 102 and the bottom of collection bin 18. Members 107 have a length dimension (A in FIG. 3) extending in the direction of heat flow between condenser 102 and bin 18, and a thickness dimension extending perpendicular to the direction of heat flow between the condenser and bin and generally transverse to the direction of refrigerant fluid flow in the condenser. The length dimension A and the thickness dimension, are selected to provide a significant resistance to heat flow between condenser 102 and the bottom of collection bin 18. This resistance permits the condensing function in condenser 102 to occur at a substantially higher temperature (typically, at least 60° F.) than the temperature (approximately 32° F.) at the bottom of bin 18, but still permits heat to flow from the condenser to the bin to effect melting and condenser heat rejection. The heat conduction rate varies directly with the thickness of the conductor members 107 and the temperature difference between the bin bottom and the condenser. The heat conduction rate varies inversely with the length A of the heat path through conductor members 107. To achieve a given heat flow rate at a required temperature differential, any decrease in the thickness of heat conducting members 107 requires a proportional decrease in the length A of these members. In effect, both the length and thickness have to be decreased in the same proportion to maintain the same heat flow rate for the desired temperature differential.

The heat flow rate also varies directly with the width dimension (from left to right in FIG. 2; into the plane of the drawing of FIG. 3) of conducting members 107. In this regard, condenser 102 may take the form of plural tubes conducting refrigerant flow in parallel as illustrated in FIG. 3, and including a heat conducting member 107 for each condenser tube section. Condenser 102 may also be configured as a single tube in a serpentine or other pattern beneath bin 18. As a further alternative, a plurality of heat conducting members can extend in side-by-side relation from all or sections of the condenser tube 102.

Figure 4:
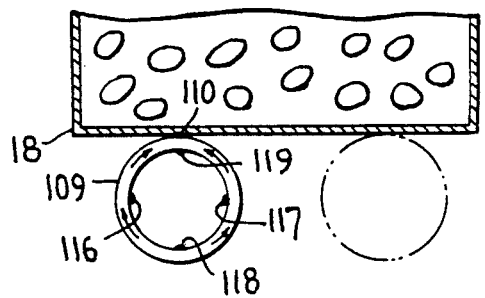
FIG. 4 is a partially diagrammatic front view in elevation of one alternative embodiment of the present invention.
Figure 5:
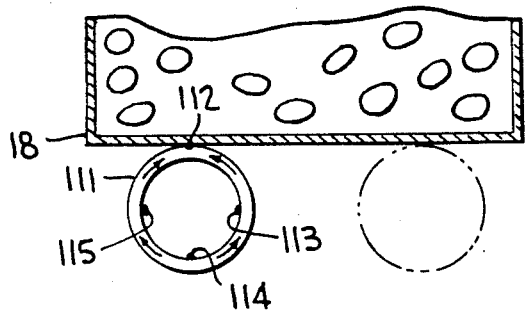
FIG. 5 is a partially diagrammatic front view in elevation of the embodiment of FIG. 4 made from a different material.

An alternative heat flow path arrangement in accordance with the present invention is illustrated in FIG. 4 and involves securing a condenser tube 109 in direct contact with the bottom of bin 18 at location 110. For purposes of this embodiment, at least, condenser tube 109 is constructed of a metal of low thermal conductivity such as stainless steel. Typical stainless steels have a thermal conductivity (K) on the order of thirteen, whereas copper, for example, has a thermal conductivity value approximately seventeen times greater (i.e., $K=220$ or thereabout). Thus, as illustrated in FIG. 5, if a conventional copper condenser tube 111 is attached to the bottom of bin at location 112, there is much less resistance to heat flow. Specifically, rejected heat of condensation flows relatively easily from locations 113, 114, 115 and all other parts of the condensing area on tube 111 to location 112 to thereby transfer heat to bin 18 directly to melt the ice, the efficiency of heat transfer between location 112 and the melting ice being quite high. However, there would be little resistance to such heat flow, and the desired difference between the condensing temperature and the ice-melting temperature would not be achieved. Conventional condensers, in which minimal temperature differential is required, invariably use copper, aluminum, or other tubing material having relatively high thermal conductivity.

On the other hand, the use of the stainless steel condenser tube 109 (FIG. 4), or a condenser tube of any other metal having a relatively low thermal conductivity, results in the required temperature differential across the heat flow path pursuant to the present invention. The rejected heat of condensation from location 118, for example, must flow around approximately one half the circumference of tube 109 in order to reach location 110. Actually, there is a double flow path, one clockwise past location 116 and another counter-clockwise past location 117. By comparison, the heat of condensation rejected at location 119 travels only a short distance to attachment location 110. Condensation occurs at all locations on the inside of tube 109; therefore, it is clear that the average distance traveled by all of the rejected heat of condensation is one half the distance between locations 118 and 110, or the distance from location 116 to location 110 (in a clockwise direction) and the distance from location 117 to location 110 (in a counter-clockwise direction). The result is two parallel flow paths each being one quarter of the circumference of condenser tube 109. An exemplary embodiment for condenser tube 109 has the following parameters and dimensions: inside diameter, ⅜ inch; $K=13$; length, twelve feet; heat rejection rate, 6,000 btu/hr; temperature differential between condensing temperature and melting temperature, 80° F.; and wall thickness of condenser tube 109, 0.070 inch. These parameters and dimensions result in satisfactory operation and are achieved by virtue of calculations based on the following formula: $K=V_T d/A(dT)$; wherein K is the thermal conductivity of the metal employed in condenser tube 109, $V_T$ is the heat flow rate through that material in btu/hr, d is the flow distance of the flow path in feet, A is the cross-sectional area of the heat flow conductor in square feet, and (dT) is the temperature difference (in °F) or gradient between the rejection temperature at the condenser and the ice melting temperature at the bin. In the exemplary dimensions, the twelve foot length of condenser tube can be arranged in the form of a number of passes under bin 18, such passes being arranged in parallel or series flow circuits depending on the overall condenser design.

By way of comparison, a design for the same performance described above, but utilizing a copper condenser tube 111 having a length of twelve feet and a value for K of 220, would require a thickness of 0.004 inch for condenser tube 111. Accordingly, it has been determined that condenser tube materials having a value of K greater than one hundred fifty would not be appropriate for the present invention.

Figure 6:
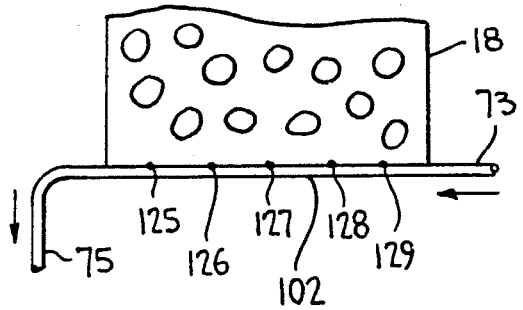
FIG. 6 is a front view in elevation of another embodiment of the present invention.

The embodiment illustrated in FIG. 6 is an alternative arrangement for providing resistance to heat flow from condenser 102 to bin 18. More particularly, direct spot contacts are provided between the condenser and bin bottom by conductors 125, 126, 127, 128 and 129. As with conductor member 107 in the embodiment of FIG. 2, each individual conductor provides a flow path of minimal length if it has a small cross-sectional area, or a longer flow path if of larger cross-sectional area. Conductors 125-129 may be spot welds, solder joints, wires positioned between condenser 102 and bin 18, or any other configuration providing a heat flow path of selected dimensions. As with the condenser in the embodiment of FIG. 2, a connected circuit of parallel or series condenser tubes may be employed to constitute the complete condenser 102.

Figure 7:
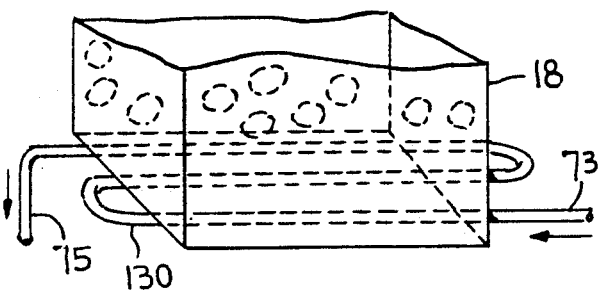
FIG. 7 is a view in perspective of still another embodiment of the present invention.

FIG. 7 illustrates another embodiment of the invention functioning to maintain a sufficiently high condensing temperature by employing an undersized ice-melting condenser in direct contact with the bottom of bin 18. The undersized condenser 130 is in direct thermal contact with the bottom of bin 18 and forms an alternative condenser as part of the system illustrated in FIG. 1. The total area of condensing surface on which refrigerant vapor can condense within undersized condenser 130 is substantially smaller than the condensing surface area of the non-melting condenser 71 (in FIG. 1). Condenser 71 operates at normal refrigeration condensing temperatures (typically 80° F., or higher) and has at least one and one-half times the condensing surface area of condenser 130. This arrangement permits a normal high condensing temperature to be maintained in condenser 130 while the heat rejection temperature is quite low (approximately 32° F.). Liquid line 75 carries off condensed liquid, and hot gas line 73 delivers compressed vapor to condenser 130.

As described in my aforementioned U.S. Pat. No. 4,897,099, the system of the present invention is operated selectively in the ice-making, non-melting mode, or in the ice-making, melting mode, by causing the changeover solenoid valves 69, 70 (FIG. 1) to direct compressed vapor to either non-melting condenser 71 (FIG. 1) or to melting condensers 102 (FIGS. 1-3 and 6) or 109 (FIG. 4) or 130 (FIG. 7). However, when switching from one condenser to another, it is possible for an indeterminate quantity of refrigerant liquid to be trapped in the condenser from which flow is being switched This may cause some variation in the refrigerant charge in the operational condenser. A conventional receiver 101 (FIG. 1) may be employed to provide a reservoir of refrigerant liquid to compensate for these variations.

Figure 8:
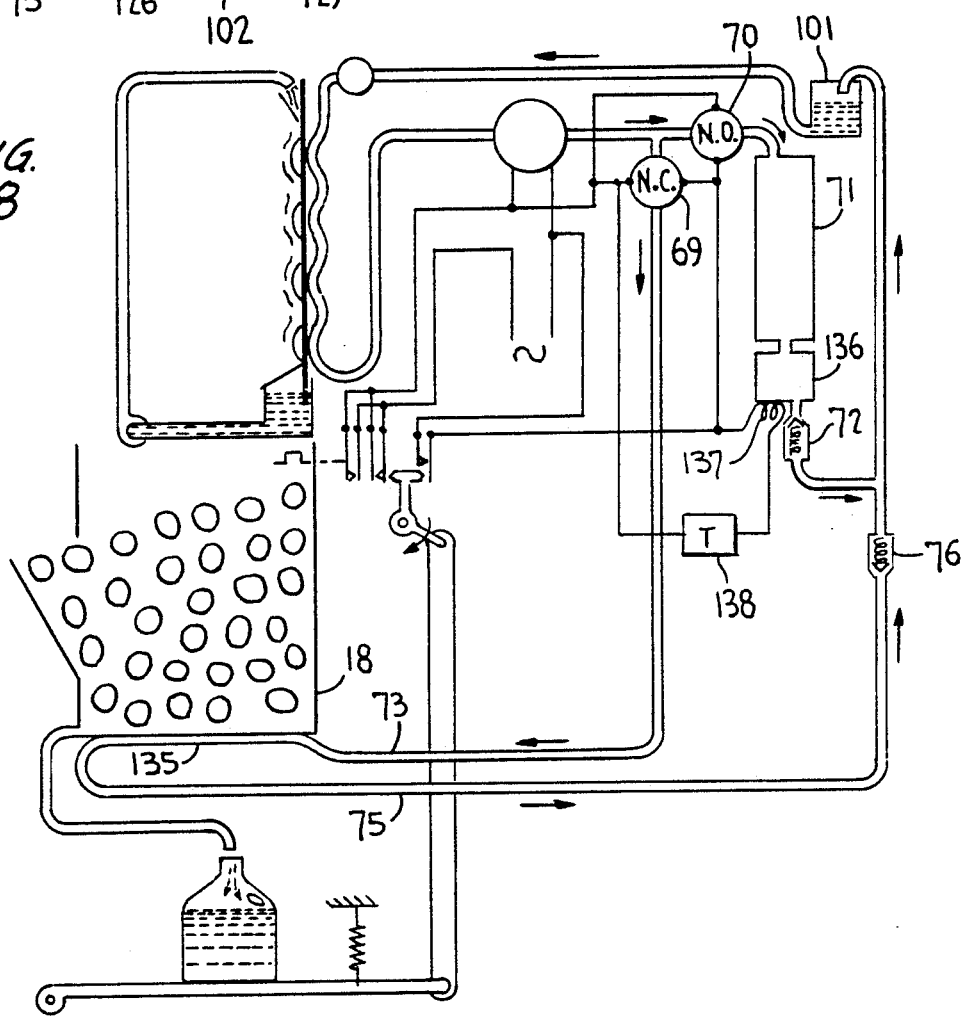
FIG. 8 is a schematic flow diagram of an overall system employing a further embodiment of the present invention.

Another method for achieving normal high condensing temperature utilizes a condenser flooding technique. Referring specifically FIG. 8 in the accompanying drawings, a melting condenser 135 is in direct contact with the bottom of collection bin 18. Condenser 135 has a condensing surface area similar to the non-melting condenser 71, but the system is overcharged with refrigerant so that, when in the ice-melting mode, condenser 135 functions in a partially flooded condition. Flooding causes the effective condensing surface area to be reduced and the condensing temperature to be increased to a suitable level in a manner often employed with low ambient refrigeration systems. When the system is switched to the non-melting mode, condenser 71 is operative but, under some off-cycle conditions, migration of some of the refrigerant overcharge may tend to flood condenser 71. However, any such excess refrigerant is absorbed in receiver 136, thereby maintaining condenser 71 free of flooding. When the system is switched back to the ice-melting mode, any liquid in receiver 136 tends to remain trapped by back pressure on check valve 72, thus preventing the desired flooding of condenser 135. To correct this problem, a heater 137 is activated to build up the temperature and pressure in receiver 136, thus forcing the trapped refrigerant liquid through check valve 72 and into the active refrigeration cycle. Activation of heater 137 can be terminated after an appropriate time interval by timer 138. As a result of this forced removal of refrigerant fluid l from condenser 71 and receiver 136 in the melting mode, condenser 71 tends to be dry of refrigerant when the system is switched back to the non-melting mode. However, receiver 101 is full at such time and some of the refrigerant therein is absorbed into the active cycle to provide a suitable operating charge.

Figure 9:
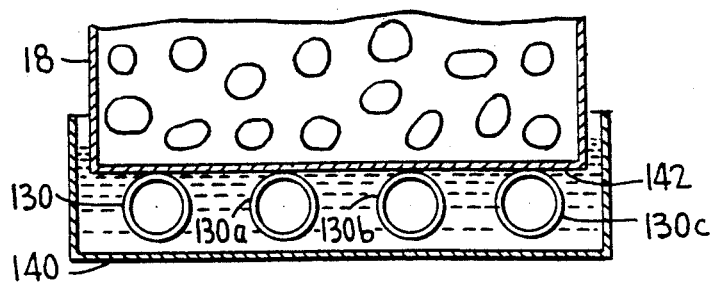
FIG. 9 is a front view in elevation of yet another embodiment of the present invention.

In the embodiment of the invention shown in FIG. 7, condenser tube 130 can be attached by metal to metal direct contact to the bottom of bin 18. An alternative arrangement is to have this tube surrounded by a bath of low temperature liquid such as ethelene glycol, whereby the liquid makes contact with the bin bottom. FIG. 9 illustrates such an arrangement wherein liquid trough 140 contains the liquid and tube 130 is submerged in the liquid. Tubes 130a, 130b, 130c are continuations of tube 130 and are formed to provide a condenser circuit. The liquid contained in trough 140 is at a level sufficiently high to contact the bottom 142 of bin 18. Heat from the condenser tubes travels through the liquid by conduction and convection to bin bottom 142.

By this method, heat from the condenser tubes is evenly distributed over the bottom 142 of bin 18. Condenser tube 135, in the embodiment illustrated in FIG. 8, can similarly be arranged in this manner.

Throughout the preceding discussion the term "tube" is sometimes used as a convenient designation for condenser passages. It is to be noted, however, that condenser passages can be constructed in other ways and are not to be limited to actual tubing.

Reference has been made herein to the use of heating means at the bottom of an ice collection bin to achieve melting of ice in the bin. The preferred embodiment of the invention employs a metal bin having heating means located outside the bin so that heat can flow through the metal bin bottom to melt the ice. However, the ice bin may alternatively be made of non-metallic material, and the ice-melting device may be placed inside the bin. It would be necessary, however, for such ice-melting device to include a flat metal plate of the same dimensions as the bin bottom so that heat from the heating unit is distributed evenly throughout the area of the bin bottom. This plate on which the ice melts effectively comprises the actual bin bottom, and any references hereinabove to the bin bottom would include such plate.

From the foregoing description it will be appreciated that the invention makes available a novel method and apparatus for efficiently melting ice collected in a bin as part of an ice-forming process in which the ice is formed as purified ice pieces from an unpurified source of water, and wherein the purified ice is melted to provide a supply of purified water.

Having described preferred embodiments of a new and improved ice maker and water purifier with controlled condensing temperature in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method for providing a supply of purified ice and a supply of purified liquid water from a source of unpurified liquid water, said method comprising the steps of:
 (a) cooling selected areas of at least one ice-forming surface to a temperature below the freezing temperature of water by conducting thermal energy to at least one evaporator passage from said selected areas of said ice-forming surface;
 (b) directing a water stream of the unpurified liquid water over said selected areas to form ice at said selected areas while washing impurities away from the formed ice with said stream;
 (c) increasing the temperature at said selected areas at various times to remove said ice from said ice-forming surface;
 (d) collecting the ice removed in step (c) in a bin;
 (e) warming a portion of said bin at selected times to melt some of the ice collected therein into purified liquid water;
 (f) collecting in a container the purified liquid water obtained in step (e);
 wherein said evaporator passage is part of a continuous refrigerant flow path for refrigerant fluid, said flow path including a compressor, condenser means, a metering device and the evaporator passage, and wherein step (a) includes energizing said compressor;

(g) sensing the amount of collected ice in said bin;

(h) sensing the amount of collected purified liquid water in said container;

(i) in response to both the amount of said collected ice in said bin exceeding a first predetermined amount, and the amount of said collected purified liquid water in said container exceeding a second predetermined amount, de-energizing said compressor;

(j) following step (i), re-energizing said compressor whenever either or both of the following occurs: (1) the amount of collected ice in said bin falls below the first predetermined amount; and (2) the amount of collected purified liquid water in said container falls below the second predetermined amount;

wherein said condenser means in said refrigerant flow path includes first and second condensers disposed in respective parallel and alternatively conductive first and second path sections, said second condenser being disposed at the underside of said bin to heat collected ice at the bottom of said bin;

(k) maintaining a suitably high condensing temperature of at least 60° F. in said second condenser while using the rejected heat from said second condenser to melt ice in said bin at a temperature of approximately 32° F.;

and wherein step (e) includes the steps of:

(e.1) in response to the amount of collected purified liquid in said container being less than said second predetermined amount, actuating said second path section to cause heated refrigerant fluid to flow through said second condenser; and (e.2) in response to the amount of collected purified liquid in said container exceeding said second predetermined amount, actuating the first path section to cause refrigerant fluid to flow through said first condenser and thereby bypass said second condenser.

2. The method according to claim 1 wherein step (b) includes conducting heat via a heat flow path between said second condenser and said bin to permit rejection heat from condensing surfaces of said second condenser to melt said ice pieces, and configuring said heat flow path to have a heat flow resistance sufficiently high to maintain a temperature gradient across the heat flow path on the order of 30° F. or greater.

3. The method according to claim 2 wherein step (b) includes conducting said rejection heat through at least one metal heat conducting member joining said second condenser and said bin.

4. The method according to claim 3 further comprising the step of selecting the length and thickness of said heat conducting member to provide resistance to said heat flow sufficient to maintain said temperature gradient.

5. The method according to claim 2 wherein step (b) comprises interposing heat conducting spot-like conductor between said bin and said second condenser at respective locations along the length of said second condenser such that each conductor serves as part of said heat flow path.

6. The method according to claim 1 wherein step (b) includes disposing said second condenser in direct contact with said bin, and providing said second condenser in an undersized configuration relative to said first condenser such that the condensing surface area in said first condenser is at least one and one-half times the condensing surface area in said second condenser, whereby the second condenser operates at a relatively high condensing temperature while the heat rejection temperature thereof is on the order of 32° F.

7. The method according to claim 1 wherein step (b) includes disposing said second condenser in direct contact with said bin and overcharging said continuous refrigerant flow path with refrigerant fluid such that the second condenser operates in a partially flooded condition to thereby reduce the effective condensing surface area in said second condenser.

8. The method according to claim 1 wherein step (b) includes disposing said second condenser in a bath of low temperature liquid in contact with said bin, and providing said second condenser in an undersized configuration relative to said first condenser such that the condensing surface area in said first condenser is at least one and one-half times the condensing surface area in said second condenser, whereby the second condenser operates at a relatively high condensing temperature while the heat rejection temperature thereof is on the order of 32° F.

9. The method according to claim 1 wherein step (b) includes disposing said second condenser in a bath of low temperature liquid in contact with said bin and overcharging said continuous refrigerant flow path with refrigerant fluid such that the second condenser operates in a partially flooded condition to thereby reduce the effective condensing surface area in said second condenser.

10. The method according to claim 2 further comprising the step of providing said second condenser as a metal tube with a thermal conductivity K no greater than one hundred fifty to produce a low effective rate of heat flow from condensing surfaces of said second condenser to the bottom of said bin.

11. A system for providing purified ice and purified water from a source of unpurified water comprising:

a continuous refrigerant flow path including a compressor, an evaporator, condenser means and a metering device;

an ice-forming surface;

means responsive to energization of said compressor for cooling selected areas of said ice-forming surface to a temperature below the freezing temperature of water by conducting thermal energy to said evaporator from said selected areas;

means for issuing a stream of the unpurified water over said selected areas to form ice at said selected areas while washing impurities away from the formed ice with said stream;

means for increasing the temperature at said selected areas at various times to remove said ice from said ice-forming surface;

a bin for collecting ice removed from said ice-forming surface;

heating means for warming a portion of said bin at selected times to melt some of the ice collected therein into purified liquid water;

container means for collecting the purified liquid water formed by melting the ice in said bin;

bin sensor means for sensing the amount of ice collected in said bin;

container sensor means for sensing the amount of purified liquid water collected in said container;

control means responsive to both said bin sensor means and said container means for de-energizing said compressor when the amount of said collected ice in said bin exceeds a first predetermined amount and when the amount of said collected purified liquid water in said container exceeds a second predetermined amount, said control means further including means for reenergizing said compressor in response to either or both of the following conditions: (1) the amount of collected ice in said bin falling below the first predetermined amount; and (2) the amount of collected purified liquid water in said container falling below the second predetermined amount;

wherein said condenser means in said refrigerant flow path includes first and second condensers disposed in said respective parallel and alternatively conductive first and second path sections, said second condenser being disposed at the underside of said bin to heat collected ice at the bottom of said bin;

means for utilizing rejected heat from said second condenser to melt ice in said bin at a temperature of approximately 32° F. while maintaining a condensing temperature of at least 60° F. in said second condenser; and wherein said heating means comprises:
first means responsive to the amount of collected purified liquid in said container being less than said second predetermined amount for actuating said second path section to cause heated refrigerant fluid to flow through said second condenser and;
second means responsive to the amount of collected purified liquid in said container exceeding said second predetermined amount for actuating the first path section to cause refrigerant fluid to flow through said first condenser and thereby bypass said second condenser.

12. The system according to claim 11 wherein said means for utilizing comprises a heat flow path for conducting rejection heat from condensing surfaces of said second condenser to said bin, and wherein said heat flow path has a heat flow resistance sufficiently high to maintain a temperature gradient thereacross on the order of 30° F. or greater.

13. The system according to claim 12 wherein said heat flow path includes at least one metal heat conducting member in thermally conductive contact with said second condenser and said bin.

14. The system according to claim 13 wherein the length and thickness of said heat conducting member establish a heat flow resistance sufficient to maintain said temperature gradient.

15. The system according to claim 12 wherein said heat flow path comprises multiple spot-like heat conductors disposed between said bin and said second condenser at respective locations along the length of said second condenser.

16. The system according to claim 11 wherein said second condenser is disposed in direct contact with said bin, and wherein said second condenser is undersized relative to said first condenser such that the condensing surface area of the first condenser is at least one and one-half time the condensing surface area of said second condenser, whereby the second condenser operates a relatively high condensing temperature while its heat rejection temperature is on the order of 32° F.

17. The system according to claim 11 wherein said second condenser is disposed in direct contact with said bin, and further comprising means for overcharging said continuous refrigerant flow path with refrigerant fluid to cause said second condenser to operate in a partially flooded condition and thereby reduce the effective condensing surface area in said second condenser.

18. The system according to claim 11 wherein said second condenser is disposed in a bath of low temperature liquid in contact with said bin, and wherein said second condenser is undersized relative to said first condenser such that the condensing surface area of the first condenser is at least one and one-half times the condensing surface area of said second condenser, whereby the second condenser operates a relatively high condensing temperature while its heat rejection temperature is on the order of 32° F.

19. The system according to claim 11 wherein said second condenser is disposed in a bath of low temperature liquid in contact with said bin, and further comprising means for overcharging said continuous refrigerant flow path with refrigerant fluid to cause said second condenser to operate in a partially flooded condition and thereby reduce the effective condensing surface area in said second condenser.

20. The system according to claim 12 wherein said second condenser is a metal tube having a thermal conductivity K no greater than one hundred fifty to provide a low effective rate of heat flow from condensing surfaces of said second condenser to the bottom of said bin.

21. A method for providing a supply of purified ice and a supply of purified liquid water from a source of unpurified liquid water, said method comprising the steps of:
(a) cooling selected areas of at least one ice-forming surface to a temperature below the freezing temperature of water by conducting thermal energy to at least one evaporator passage from said selected areas of said ice-forming surface;
(b) directing a water stream of the unpurified liquid water over said selected areas to form ice at said selected areas while washing impurities away from the formed ice with said stream;
(c) increasing the temperature at said selected areas at various times to remove said ice from said ice-forming surface;
(d) collecting the ice removed in step (c) in a bin;
(e) warming a portion of said bin at selected times to melt some of the ice collected therein into purified liquid water;
(f) collecting in a container the purified liquid water obtained in step (e);
wherein said evaporator passage is part of a continuous refrigerant flow path for refrigerant fluid, said flow path including a compressor, condenser means, a metering device and the evaporator passage, and wherein step (a) includes energizing said compressor;
(g) sensing the amount of collected ice in said bin;
(h) sensing the amount of collected purified liquid water in said container;
(i) in response to both the amount of said collected ice in said bin exceeding a first predetermined amount, and the amount of said collected purified liquid water in said container exceeding a second predetermined amount, deenergizing said compressor;

(j) following step (i), re-energizing said compressor whenever either or both of the following occurs: (1) the amount of collected ice in said bin falls below the first predetermined amount; and (2) the amount of collected purified liquid water in said container falls below the second predetermined amount;

wherein said condenser means in said refrigerant flow path includes first and second condensers disposed in respective parallel and alternatively conductive first and second path sections, said second condenser being disposed at the underside of said bin to heat collected ice at the bottom of said bin;

(k) separating said second condenser from the bottom of said bin by one or more conductors constructed of a material having high thermal conductivity, said conductors being of relatively small thickness to provide low effective heat flow characteristics;

and wherein step (e) includes the steps of:

(e.1) in response to the amount of collected purified liquid in said container being less than said second predetermined amount, actuating said second path section to cause heated refrigerant fluid to flow through said second condenser; and (e.2) in response to the amount of collected purified liquid in said container exceeding said second predetermined amount, actuating the first path section to cause refrigerant fluid to flow through said first condenser and thereby bypass said second condenser.

22. The method according to claim 21 further comprising the step of sensing the temperature at the bottom inside of the said bin and preventing the flow of heated refrigerant fluid through said second condenser in response to sensed temperatures above ice melting point.

23. a method for providing a supply of purified ice and a supply of purified liquid water from a source of unpurified liquid water, said method comprising the steps of:

(a) cooling selected areas of at least one ice-forming surface to a temperature below the freezing temperature of water by conducting thermal energy to at least one evaporator passage from said selected areas of said ice-forming surface;

(b) directing a water stream of the unpurified liquid water over said selected areas to form ice at said selected areas while washing impurities away from the formed ice with said stream;

(c) increasing the temperature at said selected areas at various times to remove said ice from said ice-forming surface;

(d) collecting the ice removed in stem (c) in a bin;

(e) warming a portion of said bin at selected times to melt some of the ice collected therein into purified liquid water;

(f) collecting in a container the purified liquid water obtained in step (e);

wherein said evaporator passage is part of a continuous refrigerant flow path for refrigerant fluid, said flow path including a compressor, condenser means, a metering device and the evaporator passage, and wherein step (a) includes energizing said compressor;

(g) sensing the amount of collected ice in said bin;

(h) sensing the amount of collected purified liquid water in said container;

(i) in response to both the amount of said collected ice in said bin exceeding a first predetermined amount, and the amount of said collected purified liquid water in said container exceeding a second predetermined amount, deenergizing said compressor;

(j) following step (i), re-energizing said compressor whenever either or both of the following occurs: (1) the amount of collected ice in said bin falls below the first predetermined amount; and (2) the amount of collected purified liquid water in said container falls below the second predetermined amount;

wherein said condenser means in said refrigerant flow path includes a first condenser and a second condenser disposed in respective parallel and alternatively conductive first and second path sections, said first condenser including means for rejecting thermal energy removed from said ice-forming surface at condensing temperatures greater than 60° F., and wherein said second condenser is disposed at the bottom of said bin to heat and melt collected ice, and wherein said first condenser has a condensing surface area at least one and one half times the condensing surface area of said second condenser;

and wherein step (e) includes the steps of:

(e.1) in response to the amount of collected purified liquid in said container being less than said second predetermined amount, actuating said second path section to cause heated refrigerant fluid to flow through said second condenser; and (e.2) in response to the amount of collected purified liquid in said container exceeding said second predetermined amount, actuating the first path section to cause refrigerant fluid to flow through said first condenser and thereby bypass said second condenser.

24. The method according to claim 23 further comprising the step of sensing the temperature at the bottom inside of the said bin and preventing the flow of heated refrigerant fluid through said second condenser in response to sensed temperatures above ice-melting point.

25. The method according to claim 23 further comprising the step of disposing said second condenser in a bath of low temperature liquid in contact with the bottom of said bin.

26. A method for providing a supply of purified ice and a supply of purified liquid water from a source of unpurified liquid water, said method comprising the steps of:

(a) cooling selected areas of at least one ice-forming surface to a temperature below the freezing temperature of water by conducting thermal energy to at least one evaporator passage from said selected areas of said ice-forming surface;

(b) directing a water stream of the unpurified liquid water over said selected areas to form ice at said selected areas while washing impurities away from the formed ice with said stream;

(c) increasing the temperature at said selected areas at various times to remove said ice from said ice-forming surface;

(d) collecting the ice removed in step (c) in a bin;

(e) warming a portion of said bin at selected times to melt some of the ice collected therein into purified liquid water;

(f) collecting in a container the purified liquid water obtained in step (e);

wherein said evaporator passage is part of a continuous refrigerant flow path for refrigerant fluid, said flow path including a compressor, condenser means, a metering device and the evaporator passage, and wherein step (a) includes energizing said compressor;

(g) sensing the amount of collected ice in said bin;

(h) sensing the amount of collected purified liquid water in said container;

(i) in response to both the amount of said collected ice in said bin exceeding a first predetermined amount, and the amount of said collected purified liquid water in said container exceeding a second predetermined amount, deenergizing said compressor;

(j) following step (i), re-energizing said compressor whenever either or both of the following occurs: (1) the amount of collected ice in s id bin falls below the first predetermined amount; and (2) the amount of collected purified liquid water in said container falls below the second predetermined amount;

wherein said condenser means in said refrigerant flow path includes a first condenser and a second condenser disposed in respective parallel and alternatively conductive first and second path sections, said first condenser including means for rejecting thermal energy removed from said ice-forming surface at condensing temperatures greater than 60° F., and wherein said second condenser is disposed at the bottom of said bin to heat and melt collected ice, said first condenser having an attached liquid refrigerant receiver in which liquid refrigerant from said first condenser is accumulated, wherein the quantity of refrigerant charge in the said refrigerant flow path is sufficient to at least partially flood said second condenser when said second condenser is in operation;

(k) accumulating refrigerant liquid in said receiver when said first condenser is conductive to prevent flooding of said first condenser; and (l) heating accumulated liquid refrigerant in said receiver to drive the refrigerant therefrom when said second condenser is in operation;

and wherein step (e) includes the steps of:

(e.1) in response to the amount of collected purified liquid in said container being less than said second predetermined amount, actuating said second path section to cause heated refrigerant fluid to flow through said second condenser; and (e.2) in response to the amount of collected purified liquid in said container exceeding said second predetermined amount, actuating the first path section to cause refrigerant fluid to flow through said first condenser and thereby bypass said second condenser.

27. The method according to claim 26 further comprising the step of sensing the temperature at the bottom inside of the said bin and preventing the flow of heated refrigerant fluid through said second condenser in response to sensed temperatures above ice melting point.

28. The method according to claim 26 further comprising the step of disposing said second condenser in a bath of low temperature liquid in contact with the bottom of said bin.

* * * * *